United States Patent [19]

Kunze

[11] 4,002,818

[45] Jan. 11, 1977

[54] LIPPED CABLE ENTRY SEAL FOR PRESSURIZED SLEEVE

[75] Inventor: Dieter Kunze, Neuried, Germany

[73] Assignee: Siemens Aktiengesellschaft, Berlin & Munich, Germany

[22] Filed: July 25, 1975

[21] Appl. No.: 599,307

[30] Foreign Application Priority Data

July 25, 1974 Germany .......................... 7425454

[52] U.S. Cl. .......................... 174/21 R; 174/77 R; 174/92; 174/93; 277/205; 277/209; 277/211
[51] Int. Cl.² .................. H02G 15/24; H02G 15/18
[58] Field of Search .......................... 174/91–93, 174/77 R, 21 R, 21 C, 22 R, 22 C, 138 F, 65 G; 277/205–211, 216, 220, 12

[56] References Cited

UNITED STATES PATENTS

| | | | |
|---|---|---|---|
| 2,958,721 | 11/1960 | Fiet et al. | 174/77 R |
| 3,158,379 | 11/1964 | Nava et al. | 174/93 UX |
| 3,254,153 | 5/1966 | Kohler | 174/93 |
| 3,337,681 | 8/1967 | Smith | 174/92 |

FOREIGN PATENTS OR APPLICATIONS 1,053,609 3/1959 Germany .......................... 174/93

*Primary Examiner*—Laramie E. Askin
*Attorney, Agent, or Firm*—Hill, Gross, Simpson, Van Santen, Steadman, Chiara & Simpson

[57] ABSTRACT

A protective sleeve for a cable which is to be pressurized internally for leak-detection and cable preservation has a seal near an end thereof through which one or more cables pass into the interior of the sleeve. The seal has a lip formed about the periphery of its inner face, subject to pressure within the sleeve and extending radially and longitudinally from the face to engage the interior surface of the sleeve or sealing compound placed thereon. Pressure within the sleeve forces the lip against the interior surface of the sleeve to form a gastight seal regardless of reasonable variations in the internal diameter of the sleeve. One or more lamellations back up the inner, sealing face of the seal and engage each cable passing through the seal. The seal is conveniently made in two pieces for fitting about a continuous cable, and the sections of the seal are joined by tongue and groove arrangements or enlarged sealing surfaces at the joints.

6 Claims, 4 Drawing Figures

LIPPED CABLE ENTRY SEAL FOR PRESSURIZED SLEEVE

BACKGROUND OF THE INVENTION

1. Field of the Invention

The invention concerns a sealing member for the sealed entry of cables into longitudinally divided cable sleeves containing gas pressure.

2. The Prior Art

For the insertion of electric cables into cable sleeves, various problems have been recognized concerning the integrity of the gas seal achieved. The German Offenlegungsschrift 2,126,827, describes a ring sealing element having a groove ring and a supporting element in the groove, whereby the sides of the groove are spread in a state of rest. The sides, with their frontal areas inclined at an acute angle, form lips whose adjoining sealing surfaces approach linearity. The sealing lip is round and the side areas are mobile, so that the effective contact surface of the sealing lip is independently altered under varying pressure conditions. This ring sealing element is, however, unsuited to the sealing of cable inlets, since the diameters of cable fittings and cables to be inserted usually vary greatly, so that a diameter adjustment must also take place at the cable sealing location.

From the German Offenlegungsschrift 1,958,155 (corresponding to U.S. Pat. No. 3,205,950), sealing elements of a slip-over or double socket sleeve type are known, which seal the interior space of the sleeve against the cable by means of one or several lips, or by means of a labyrinth. Seal edges are thus pressed against the cable sleeve solely by the elastic force of the material.

Pressure resistant cable terminal sealing apparatus of the German Offenlegungsschrift 2,235,415 has two highly elastic sealing plates described as sealing elements, whose cable openings each have a somewhat smaller diameter than the cable conveyed therethrough.

SUMMARY OF THE INVENTION

The primary object of the invention is to provide a sealing member to close a cable sleeve outwardly of a cable, where the cable sleeve is pressurized, in a simple manner with particular emphasis on compensation for varying tolerances in sleeve and cable diameters.

In accordance with the principles of the present invention, a sealing member is provided at least on the side facing the interior of the cable sleeve and under pneumatic pressure with extensions forming lips which are elastically pressed against the cable sleeve by the pressure within the sleeve. For use with continuous cable lengths, the seal is made separable through diameters of the cables, and the sections of the seal formed thereby are fitted together by tongue and groove means or enlarged contact areas with tensioning members.

DESCRIPTION OF THE PREFERRED EMBODIMENTS

Figure 1:
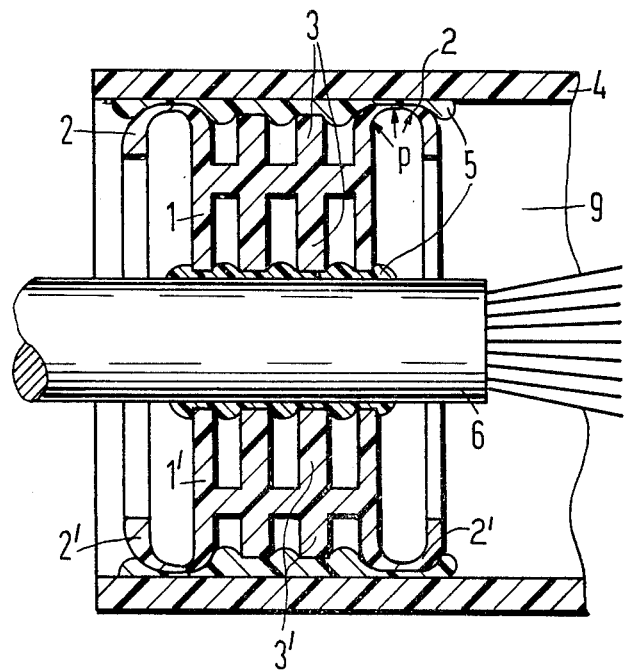
FIG. 1 is a cross-sectional view longitudinally through a cable sleeve and seal of a first embodiment of the present invention.

In FIG. 1, a cable entry seal for pressurized sleeve is shown having symmetrical upper and lower halves 1, 1' made of an elastic synthetic material. Each half of the seal has lamellar sealing elements 3 or 3' spaced apart in the longitudinal direction. The outer-most sealing elements from a center of the seal have curved lips 2, 2 or 2', 2' which extend radially and longitudinally outwardly from the sealing face to a diameter somewhat greater than the internal diameter of a cable sleeve 4 which is to be sealed. Making the seal axially symmetric eases assembly of the cable sleeve and seal unit by preventing reversed installations. A plastic sealing compound 5 placed about the inner diameter of the sleeve 4 and about the outside of a cable 6 which is to enter the sleeve 4 will increase the integrity of the seal. After assembly, the lips 2, 2' will by their own elasticity form a seal between the cable 6 and the cable sleeve 4, but upon charging of the internal portion 9 of the cable sleeve 4 with a gas to a pressure "P" to preserve the cable 6 and/or to activate a leak detection system, the pressure will force the lips 2, 2' radially outwardly with additional force into the sealing compound 5 and against the sleeve 4. Use of a plastic sealing compound 5 is in any event necessary between the halves 1 and 1' of the seal. The lamellations 3, 3' increase the sealing action between the cable 6 and the seal by increasing the sealing length by penetration of the sealing matter 5 into the spaces between the lamellae 3 and 3'.

Figure 2:
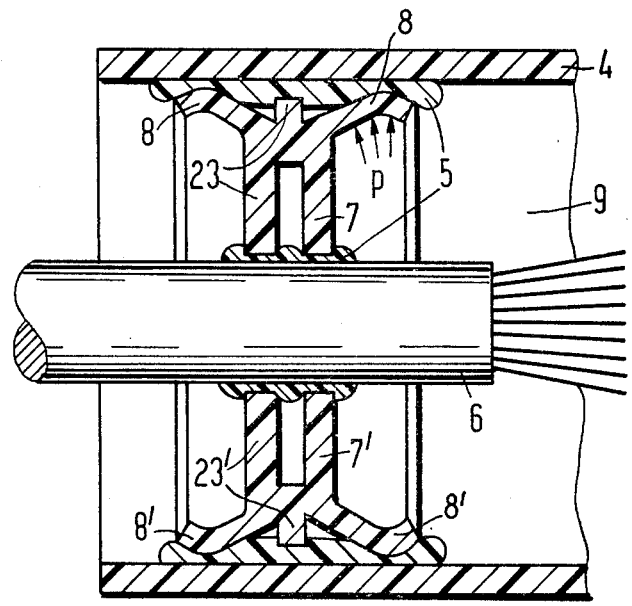
FIG. 2 is a cross-sectional view similar to FIG. 1 but of a second embodiment.

FIG. 2 illustrates a second embodiment of the invention, wherein sealing member halves 7 and 7' have lips or extensions 8 and 8', respectively, which are especially suited for compensating for tolerances and possible deformations of the cable sleeve 4. As in the embodiment of FIG. 1, prevailing internal pressure p in the cable sleeve interior 9 presses the lips 8 and 8' against the cable sleeve 4 through the sealing compound 5 deposited thereon. Also, lamellations 23, 23' are provided for increasing the sealing action with the sealing compound 5.

Where the cable 6 is near the end of the sleeve 4, the seal member need not be formed in two pieces, 1, 1' or 7, 7' but rather may be formed in a single piece and threaded over the end of the cable 6.

Figure 3:
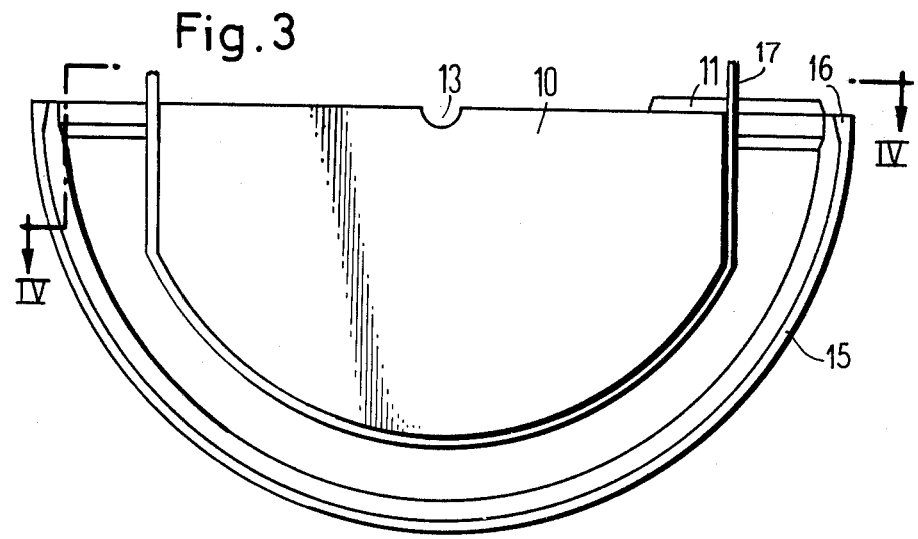
FIG. 3 is an axial view of half of a seal according to a third embodiment of the invention.
Figure 4:
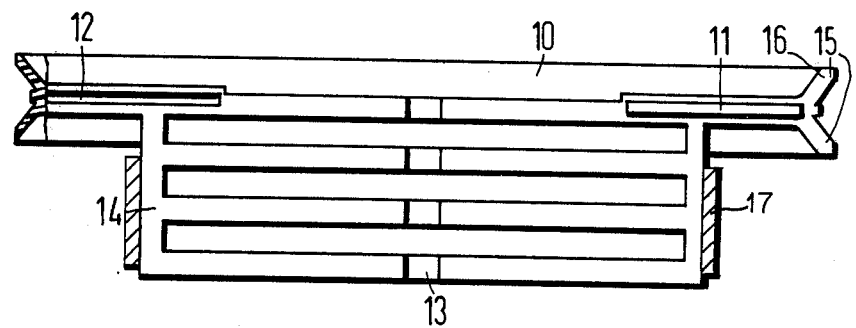
FIG. 4 is a rotated top plan view, partially in section, on line IV—IV of FIG. 3.

A third embodiment of a cable entry seal is shown in FIGS. 3 and 4. The sealing member in this embodiment is formed from two symmetric semicircular parts of which one is shown at 10 in each of FIGS. 3 and 4. Each half 10 has a tongue 11 and a groove 12 formed thereon or therein to cooperate with the corresponding opposite half. An aperture 13 is formed on the axis of each of the halves 10 through the lamellations 14. Prior to coating the edges of each half 10 with sealing compound, the lamellations 14 are clamped together with those of the opposite half and a cable entry is cut out with an appropriate diameter borer along the aperture 13. In accordance with the invention, annular lip means 15, 15 are formed about the greatest diameter of the seal 10. Each lip 15 has an enlarged area 16 to provide an increased contact surface at the joint between the two halves 10 of the seal. Once the cable inlet opening 13 has been formed and the part surfaces coated with sealing compound, a tension band or member 17 is placed about the lamellations 14 and tightened to seal the seal upon the cable. The seal is then forced into the cable sleeve with the lips 15, 15 engaged against the inside diameter of the sleeve as in the other embodiments.

Although the various embodiments have been described with only one, axial cable running through the seal, each is adaptable to use with several cables. When several uncut cables are used, division of the sealing member must be made through each of the cable inlet openings on a diameter thereof. If the cable inlet openings do not lie along one line, the sealing member may be cut into several segments, which are then readily reassembled into position for insertion into the cable sleeve 4.

Although various minor modifications might be suggested by those versed in the art, it should be understood that I wish to embody within the scope of the patent warranted hereon all such modifications as reasonably and properly come within the scope of my contribution to the art.

I claim as my invention:

1. A cable sleeve entry seal adapted to position and seal at least one cable passing therethrough and to contain pressurized gas about said cable and within a cable sleeve thereabout comprising:
   a lip member extending radially outwardly and longitudinally inwardly from a longitudinally inward radial sealing surface of said entry seal and engageable with an inner surface of said sleeve, the lip being sealed against said sleeve surface by gas pressure thereon from within said sleeve and inwardly of said seal;
   a coating of plastic sealing compound applied to an inner surface of said sleeve and to an outer surface of said cable; and
   at least two longitudinally-spaced, radially inwardly extending sealing elements engaging said cable surface via said sealing compound coated on said cable surface.

2. A cable entry seal as defined in claim 1, wherein the seal is longitudinally divided into sections through a diameter of each cable opening in said seal and the lip member has a cross-section which is enlarged at each longitudinal division of the seal in comparison to cross-sections at any other portion of the lip, thereby to increase the contact sealing area between said seal portions.

3. A cable entry seal as defined in claim 1, further comprising at least one lamellar sealing element extending radially from said cable to said sleeve and spaced longitudinally apart from said lip member.

4. A pressurized cable sleeve seal having a cable extending therethrough, the seal being divided longitudinally and fitting tightly on said cable and having a seal means extending generally radially from said cable to an inner wall of said cable sleeve, said seal means having a peripheral lip extending into a pressurized interior portion of said cable sleeve in juxtaposition to said inner wall of said cable sleeve whereby the pressure within said cable sleeve forces said peripheral lip into tight-fitting engagement with the inner wall of said cable sleeve, and the tight fit of said seal on said cable is effected by tensioning band circumferentially about said seal.

5. A pressurized cable sleeve seal as defined in claim 4, wherein said seal means has a longitudinal thickness including a plurality of longitudinally-spaced lamellar plates, said plates strengthening said seal means and improving the seal provided thereby.

6. A sealing member consisting of a synthetic material for the sealed entry of at least one cable into an end of a hollow cable sleeve and comprising:
   two symmetrically constructed semicircular seal sections;
   a first longitudinal portion of each said seal section having a diameter with cushioned circumferential sealing lips thereon engageable with inward surfaces of said cable sleeve;
   a second longitudinal portion of each said seal section comprising a generally cylindrical projection extended longitudinally opposite the direction of cable entry and having a second, smaller diameter;
   a plurality of longitudinally-spaced, lamellar sealing elements in said first and second longitudinal portions engageable with an exterior surface of the cable; and
   the semi-circular seal sections after insertion of said cables into the sleeve being clamped together about the cable by means of a tension band arranged about said projection having the smaller diameter.

* * * * *